United States Patent
Dombkowski et al.

(10) Patent No.: US 6,647,024 B1
(45) Date of Patent: Nov. 11, 2003

(54) SYSTEM AND METHOD FOR AN ALL DIGITAL COMMUNICATION SYSTEM WITH A LIFE LINE

(75) Inventors: Kevin Eugene Dombkowski, Oswego, IL (US); Steven Mark Miller, Batavia, IL (US); Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/306,751

(22) Filed: May 7, 1999

(51) Int. Cl.[7] .................................................. H04J 1/02
(52) U.S. Cl. ................... 370/493; 370/352; 379/90.01; 379/323
(58) Field of Search ................... 370/352, 353, 370/354, 480, 489, 490, 493, 535; 379/399, 398, 93.9, 402, 90.1, 164–173, 413, 412, 186–187, 322–324, 493

(56) References Cited

U.S. PATENT DOCUMENTS

| | | | | |
|---|---|---|---|---|
| 5,237,606 A | * | 8/1993 | Ziermann | 363/21.14 |
| 5,889,856 A | * | 3/1999 | O'Toole et al. | 370/480 |
| 6,061,392 A | * | 5/2000 | Bremer et al. | 375/222 |
| 6,185,225 B1 | * | 2/2001 | Proctor | 370/463 |
| 6,243,377 B1 | * | 6/2001 | Phillips et al. | 370/354 |
| 6,272,219 B1 | * | 8/2001 | De Bruycker et al. | 379/399.01 |
| 6,282,189 B1 | * | 8/2001 | Eames | 370/352 |
| 6,396,531 B1 | * | 5/2002 | Gerszberg et al. | 348/14.01 |
| 6,414,952 B2 | * | 7/2002 | Foley | 370/352 |
| 6,483,902 B1 | * | 11/2002 | Stewart et al. | 379/90.01 |

* cited by examiner

*Primary Examiner*—Dang Ton
*Assistant Examiner*—Phuc Tran (57) ABSTRACT

A communication system and method for supporting both POTS and high speed data services between a remote CPE interface, located at a subscriber premises, and a central office. An analog to digital converter transforms an analog POTS signal to a digital POTS signal, and a combiner circuit combines the digital POTS signal with a high speed data signal into a combined digital signal which preferably has a single communication spectrum. A power detector identifies a power failure at the remote CPE interface, and a life line communication path is established from the central office to the remote CPE interface in response to the power failure.

22 Claims, 5 Drawing Sheets

SYSTEM AND METHOD FOR AN ALL DIGITAL COMMUNICATION SYSTEM WITH A LIFE LINE

BACKGROUND OF THE INVENTION

This invention relates to telecommunication equipment that provides voice lines as well as digital and data service lines, and more particularly to plain old telephone service (POTS) lines for high speed data service.

In the United States subscribers are commonly provided with telephone services known as plain old telephone services (POTS). Such services include providing conventional dial tone and automated dialing features, including the use of dual frequency tone signaling to communicate dialed number information. Additional modem telephone features include conferencing, call waiting, incoming caller identification and other commercially available features.

Subscribers utilize a POTS line to carry conventional voice or data signals via the public switch telephone network. Modems are currently available which advertise data communication rates up to 56 Kilobits (Kb) per second over POTS lines. However, POTS lines have a limited maximum data rate as a result of the terminating circuitry at the central office.

For higher data rates than are supported by POTS lines, subscribers in the United States can lease special subscriber lines from their telephone providers. Such higher speed lines utilize different terminating circuitry at the central office to accommodate higher data rates. There are many different types of high speed digital subscriber line (XDSL) services such as asymmetrical digital subscriber line (ADSL), high bit rate digital subscriber line (HDSL), high bit rate digital subscriber line-2 (HDSL-2), rate adaptive digital subscriber line (RDSL), symmetric digital subscriber line (SDSL), very high speed digital subscriber line (VDSL), ADSL-lite, and other similar high speed digital services. Additionally, there are other non-digital high speed transmission techniques.

As an example, the known asynchronous digital subscriber line (ADSL) technique which is supported by available equipment provides a significantly higher data rate to a subscriber over a POTS subscriber line. Of course, the ADSL service requires proper terminating equipment at the central office and at the consumer premise to accommodate the greater throughput capabilities, i.e. data rates.

Figure 1:
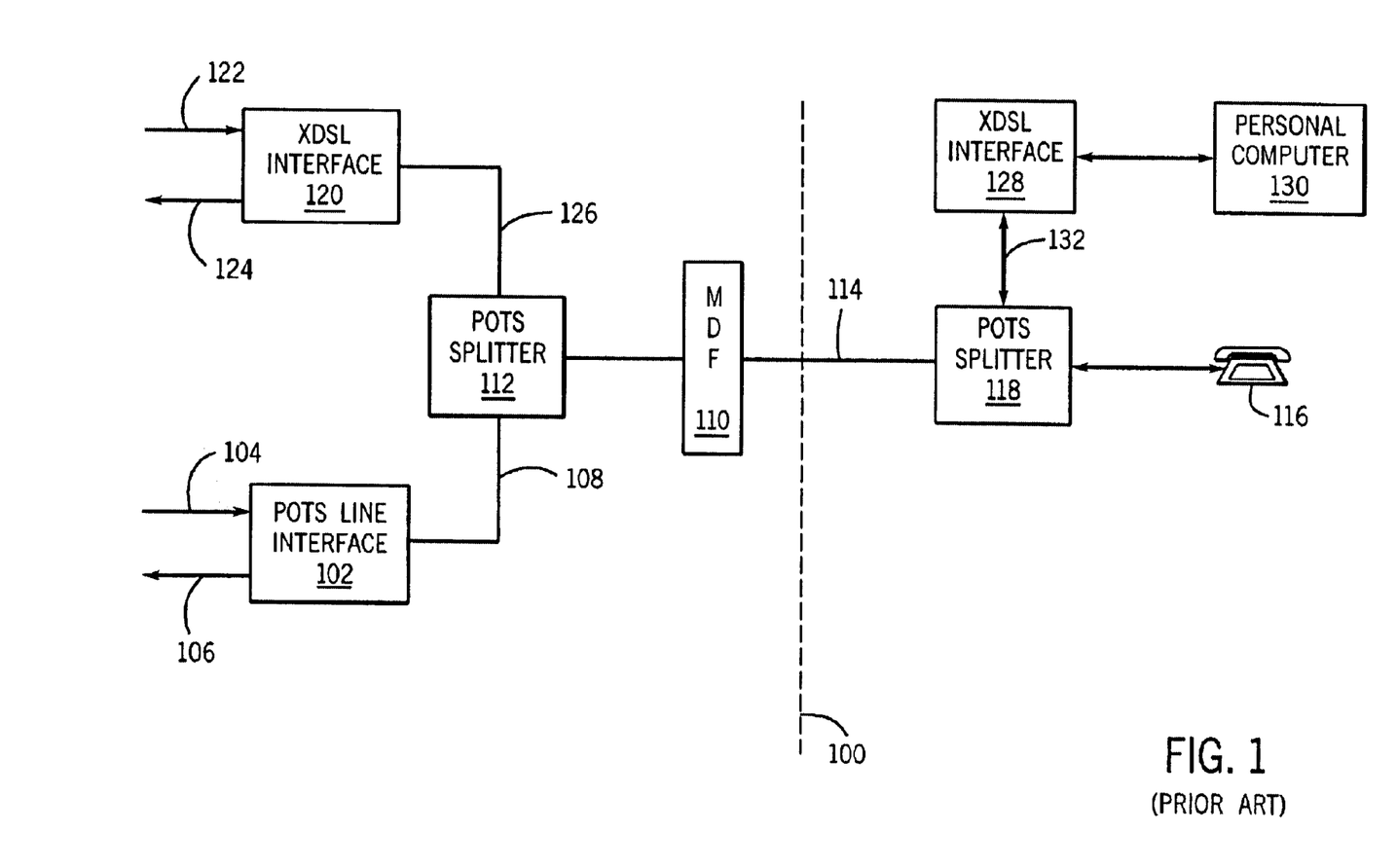
FIG. 1 illustrates a prior art implementation in which a subscriber is provided POTS and high speed data services by using a POTS splitter to support the line termination equipment.

FIG. 1 illustrates available services in the United States to subscribers using conventional two-wire copper loops. Equipment to the right of the dashed line 100 represents customer premise equipment (CPE). Equipment to the left of the dashed line 100 represents central office line termination equipment. A POTS line interface 102, also known as a line card, provides an interface between digital incoming and outgoing communication lines 104 and 106, and analog signals carried on subscriber line 108. For example, lines 104 and 106 may carry 64 Kb per second pulse coded modulation (PCM) signals representative of analog information received from and transmitted to line 108. A main distribution frame (MDF) 110 is used to interconnect a plurality of incoming subscriber lines to various terminating equipment at the central office. In this example, line 108 is connected through a POTS splitter 112 and MDF 110 to subscriber line 114. A conventional telephone instrument 116 at the site of the consumer is connected through a POTS splitter 118 to subscriber line 114.

FIG. 1 also illustrates another service to the subscriber which provides a high speed data capability. An XDSL interface circuit 120 provides an interface between the central office and a subscriber for terminating the receiving data at rates up to several megabits per second. Lines 122 and 124 provide inbound and outbound digital data communications, representative of information to and from the subscriber, carried on line 126. Line 126 is connected via POTS splitter 112 and MDF 110 to subscriber line 114. An XDSL interface 128 provides an interface between conventional digital data, communicated with a personal computer 130, and XDSL analog format signaling communicated on line 132. The POTS splitter 118 couples the XDSL signal between XDSL interface 128 and subscriber line 114. The advantage to the user is that the XDSL facilities support a substantially higher data rate than would be available if the subscriber utilized communications terminated via the POTS line interface 102.

The POTS splitter 112 combines the high frequency XDSL signals and low frequency POTS signals into a new combined communication signal. The POTS splitter 118 performs the reverse operation of the POTS splitter 112 and outputs a high frequency XDSL signals and low frequency POTS signals from the combined communication signal.

A disadvantage in such conventional systems is that POTS splitters are needed to separate the XDSL and POTS signals. POTS splitters take up a lot of room in the central office offices were space is valuable. Using the 0–4 kHz band for POTS and the 4–30 kHz band for POTS splitters results in only 64 kbps of information in 30 kHz of bandwidth. This is very inefficient use of bandwidth. It is even more problematic because the low bandwidths of a telephone loop are the best frequencies to be used by XDSL technologies since these frequencies have the lowest loss and have the least amount of interference. An alternative suggested by others is to use two copper pairs for each customer, one pair for POTS and one pair for XDSL. This is inefficient use of copper pairs.

SUMMARY OF THE INVENTION

The above problems are solved and a number of technical advances are achieved in the art by implementation of a system and method that allows an all digital communication system with a life line.

In accordance with the invention, a method of telephonic signaling in a communication system between a central office and a remote consumer premises equipment (CPE) interface, located at a subscriber premises, in which the communication system supports both plain old telephone service (POTS) and high speed data services is described. The method comprises the steps of transforming an analog POTS signal to a digital POTS signal, and combining the digital POTS signal with a high speed data signal into a combined digital signal which preferably has a single communication spectrum. In the case of a power failure, the method further includes the steps of identifying the occurrence of a power failure at a remote CPE interface, and establishing a life line communication path from the central office to the remote CPE interface in response to the power failure.

Also in accordance with the invention, a communication system that supports both POTS and high speed data services between a remote CPE interface, located at a subscriber premises, and a central office is described. The system comprises an analog to digital converter for transforming an analog POTS signal to a digital POTS signal, and a combiner circuit for combining the digital POTS signal with a high speed data signal into a combined digital signal which preferably has a single communication spectrum. In the case of a power failure, the system further includes a power detector for identifying the occurrence of a power failure at the remote CPE interface, and means for establishing a life line communication path from the central office to the remote CPE interface in response to the power failure.

BRIEF DESCRIPTION OF THE DRAWINGS

The foregoing advantageous features of the invention will be described in detail and other advantageous features will be made apparent upon reading the following detailed description that is given with reference to the several figures of the drawings in which.

DETAILED DESCRIPTION

In accordance with the present invention, a single subscriber line supports at least two different classes of subscriber service, e.g., POTS and high speed data services such as XDSL. The "X" in XDSL represents one of a family of digital subscriber services such as ADSL (asynchronous), ADSL-lite, HDSL (high bit rate), HDSL-2 (high bit rate-2), RDSL (rate-adaptive), SDSL (symmetric), and VDSL (very high speed). As used herein, high speed data interface refers to an apparatus that uses a signaling method to provide higher data transmission speeds than can be supported by conventional POTS line transmitting equipment.

Figure 2:
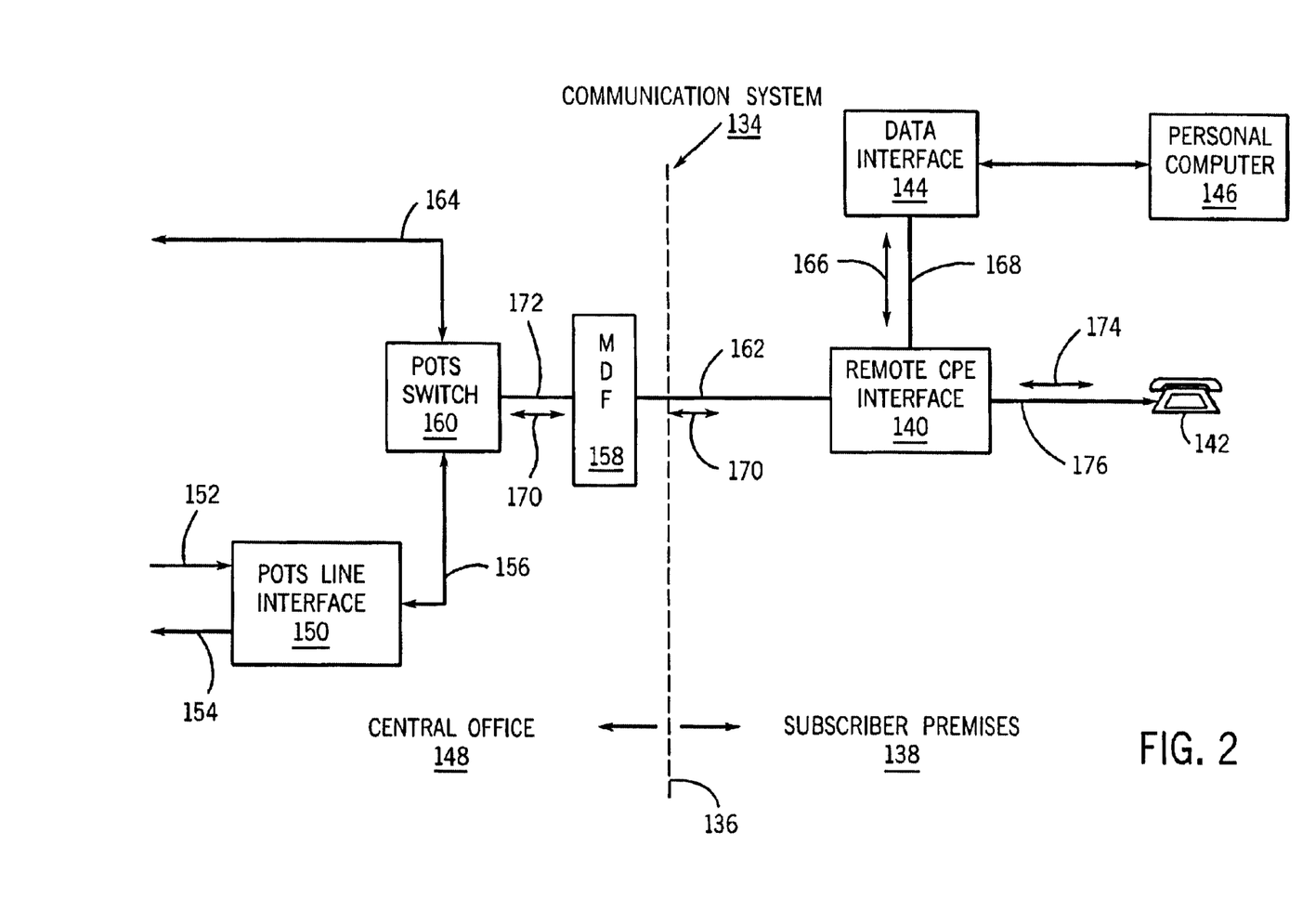
FIG. 2 illustrates a block diagram of an embodiment of the present invention.

FIG. 2 illustrates a communication system 134 in accordance with the invention. Equipment to the right of a dashed line 136 represents the equipment located at the subscriber premises 138. This equipment includes a remote customer premise equipment interface (remote CPE interface) 140, a customer premise equipment (CPE) device 142, a data interface 144, and a personal computer (PC) 146. The equipment to the left of the dashed line 136 represents the central office 148 line termination equipment. A POTS line interface 150, also known as a line card, provides an interface between incoming and outgoing digital communication lines 152 and 154, and the signals carried on line 156. A main distribution frame. (MDF) 158 is used to interconnect a plurality of incoming subscriber lines to various terminating equipment at the central office 148. As an example, line 156 is connected through a POTS switch 160 and MDF 158 to subscriber line 162. The CPE device 142 at the subscriber premises 138 is connected through the remote CPE interface 140 to the subscriber line 162. It is appreciated that the subscriber line 162 is a two-wire copper line (tip and ring) that is also known as a subscriber loop.

FIG. 2 also illustrates the high speed data service capability. The POTS switch 160 provides an interface between the central office 148 and a subscriber for terminating the receiving data at rates up to several megabits per second. Line 164 provides inbound and outbound high speed digital data communications (it is appreciated that line 164 may also selectively contain digital POTS signals), representative of information to and from the subscriber with the central office 148. Line 164 is connected, via the POTS switch 160 and MDF 158, to subscriber line 162. A data interface 144 provides an interface between conventional digital data, communicated with a PC 146, and the XDSL format signaling (also known as an extracted high speed data signal) 166 communicated on line 168 from the remote CPE interface 140. It will be appreciated by those skilled in the art that equipment other than PC 146 may be utilized to transmit or receive a variety of data representing different types of information.

The POTS switch 160 combines the high frequency XDSL signals (high speed data signals) 164 and low frequency POTS signals (analog POTS signals also known as voice data transmission) 156 into a new combined digital signal 170. The combined digital signal 170 is then passed by the MDF 158 to the subscriber line 162 via a signal path 172. The remote CPE interface 140 receives the combined digital signal 170 via the subscriber line 162 and selectively performs the reverse operation of the POTS switch 160. From the combined digital signal 170, the remote CPE interface 140 outputs the extracted high speed data signal 166 to the data interface 144, via line 168, and a low frequency POTS signal (analog telephonic signal) 174 to the CPE device 142, via connection 176.

Figure 3:
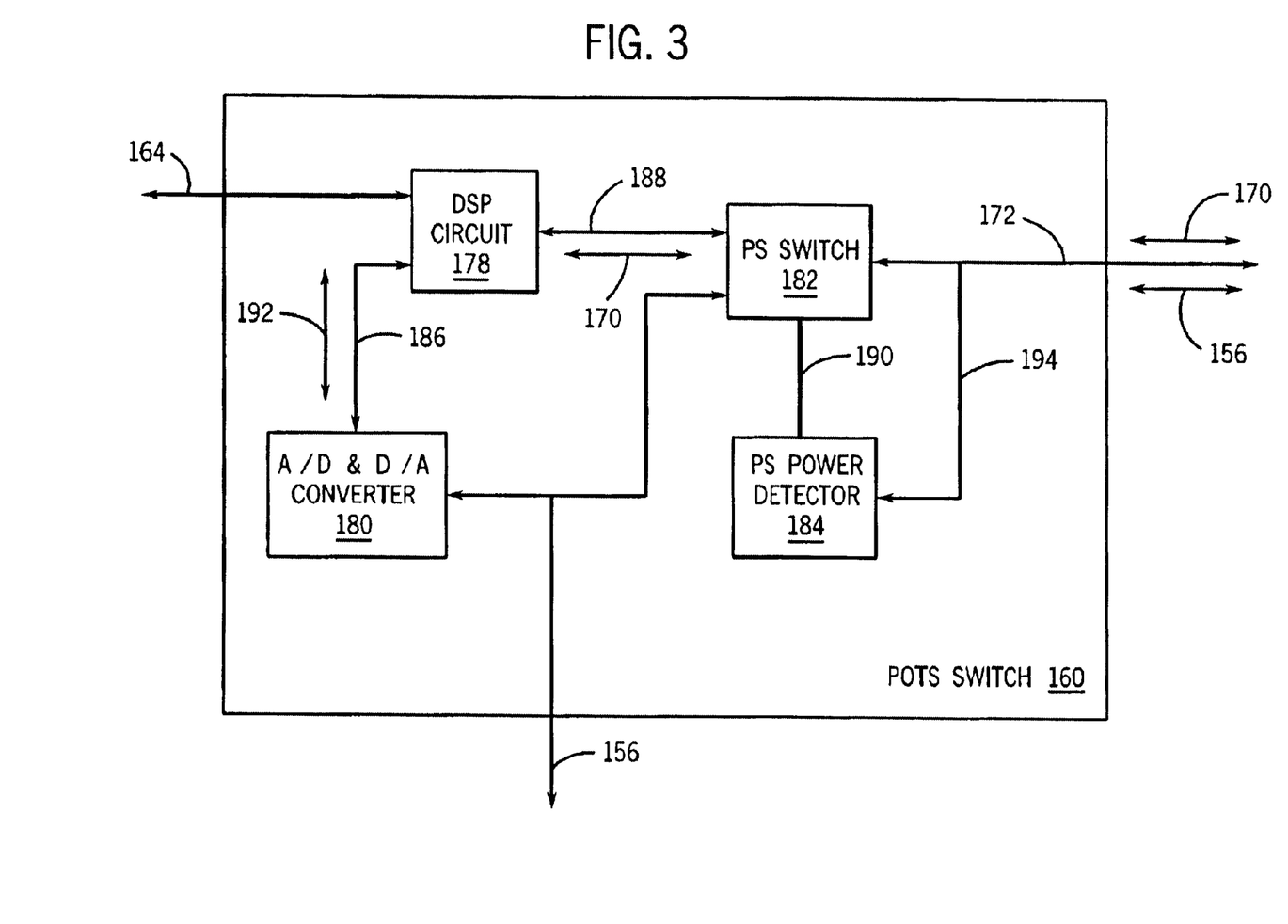
FIG. 3 shows a block diagram for the POTS switch block shown in FIG. 2.

FIG. 3 illustrates the function blocks of the POTS switch 160. The POTS switch 160 comprises a digital signal processing (DSP) circuit 178, analog to digital (A/D) and digital to analog (A/D) converter 180, a PS (POTS Switch) switch 182, and a PS power detector 184. The DSP circuit 178 is connected to the A/D and D/A converter 180, via connection 186, and the PS switch 182 via connection 188. The PS power detector 184 is connected to the PS switch 182 via connection 190.

In one direction (communication going from the central office 148, FIG. 2 to the subscriber premises 138), the A/D and D/A converter 180, FIG. 3, functions as a analog to digital converter. The A/D and D/A converter 180 receives the analog POTS signal 156, converts it to a digital POTS signal 192 and passes it, via connection 186, to the DSP circuit 178. In this direction, it is appreciated that the DSP circuit 178 functions as a combiner circuit.

The DSP circuit 178 receives the high speed data signal 164, from the central office 148 network, and combines it with the digital POTS signal 192 creating the combined digital signal 170. The DSP circuit 178 then transmits the combined digital signal 170, on line 188, to the PS switch 182. The DSP circuit 178 is preferably any digital circuit that is capable of combining the high speed data signal 164 and the digital POTS signal 192 in the combined digital signal 170. Examples of the DSP circuit 178 include multiplexer circuits, interlacer circuits, multiplier circuits, digital encoders circuits or any other combiner circuit equivalent.

Unlike the system described in FIG. 1 which combines the XDSL signal 126 and the analog POTS signal 108 by using two discrete portions of the communication spectrum, the combined digital signal 170, FIG. 3, has a single communication spectrum. The combined digital signal 170, FIG. 3, has one frequency band that employs the entire communication spectrum. The DSP circuit 178 combines the high speed data 164 and the digital POTS signal 192 using well known digital techniques (such as multiplying, multiplexing, interleaving, and encoding) that allow the combined digital signal 170 to be continues in frequency across the entire communication spectrum including the POTS 0–4 kHz frequency band.

It is appreciated that the combined digital signal 170 may selectively use two frequency bands if the XDSL system employs frequency division multiplexing (FDM) techniques because of the existence of both an upstream and a downstream channel. Examples of such systems would include ADSL, ADSL-lite, and VDSL systems. However, even in these examples the combined digital signal 170 is composed of a POTS signal and high speed data signal that are spectrally combined.

PS switch 182 receives both the analog POTS signal 156 and the combined digital signal 170. If the remote CPE interface 140, FIG. 2, is powered at the subscriber premises 138, the PS switch 182, FIG. 3, passes the combined digital signal 170 to line 172. If instead, the remote CPE interface 140, FIG. 2, is not powered (possibly the result of a power failure) at the subscriber premises 138, the PS switch 182, FIG. 3, passes the analog POTS signal 156 to line 172. This situation is called a life line condition. The PS switch 182 is preferably a filter, splitter, or relay device.

The PS power detector 184 is an intelligent circuit that determines whether a power failure has occurred at the remote CPE interface 140, FIG. 2. If a power failure has occurred, the PS power detector 184 sets the PS switch 182 to pass the analog POTS signal 156 (herein referred to as a life line signal) to the line 172. It is appreciated that the PS power detector 184 may selectively determine a power failure at the remote CPE interface 140, FIG. 2, by either sampling the signals communicated on line 172, FIG. 3, via line 194, receiving a power failure indication signal from the remote CPE interface 140, FIG. 2, via lines 172, FIG. 3, and 194, or receiving a power failure indication from the central office 148. The PS power detector 184 may selectively include the circuitry of a power meter.

In the other direction (communication from the subscriber premises 138, FIG. 2, to the central office 148), PS switch 182, FIG. 3, receives a signal via line 172. If the signal indicates that a power failure has occurred at the remote CPE interface 140, FIG. 2, the signal is determined to be an life line signal (of a type similar to the analog POTS signal 156), FIG. 3, and the PS power detector 184 sets the PS switch 182 to pass the life line signal to the POTS line interface 150, FIG. 2, via the connection of the analog POTS signal 156. If instead the signal does not indicate a power failure, the signal is determined to be combined digital signal 170 from the remote CPE interface 140, FIG. 2, and the PS power detector 184, FIG. 3, sets the PS switch 182 to pass the combined digital signal 170 to the DSP circuit 178 via line 188.

In this direction the DSP circuit 178 functions as an uncombiner circuit. The DSP circuit 178 receives the combined digital signal 170 and extracts the high speed data signal 164 and passes it to the central office 148 network equipment. The DSP circuit 178 also extracts the digital POTS signal 192 and passes it to the A/D and D/A converter 180 via connection 186. The A/D and D/A converter 180 (which operates as a digital to analog converter in this direction) then converts the digital POTS signal 192 to the analog POTS signal 156 and passes it to the POTS line interface 150, FIG. 2.

If the POTS line interface 150 and the POTS switch 160, FIG. 2, are selectively integrated into one platform an alternative example is to connect line 186, FIG. 3, to a digital point in the POTS line interface 150, FIG. 2. This example eliminates the back to back D/A and A/D conversions between the POTS line interface 150 and the A/D and D/A converter 180, FIG. 3.

Figure 4:
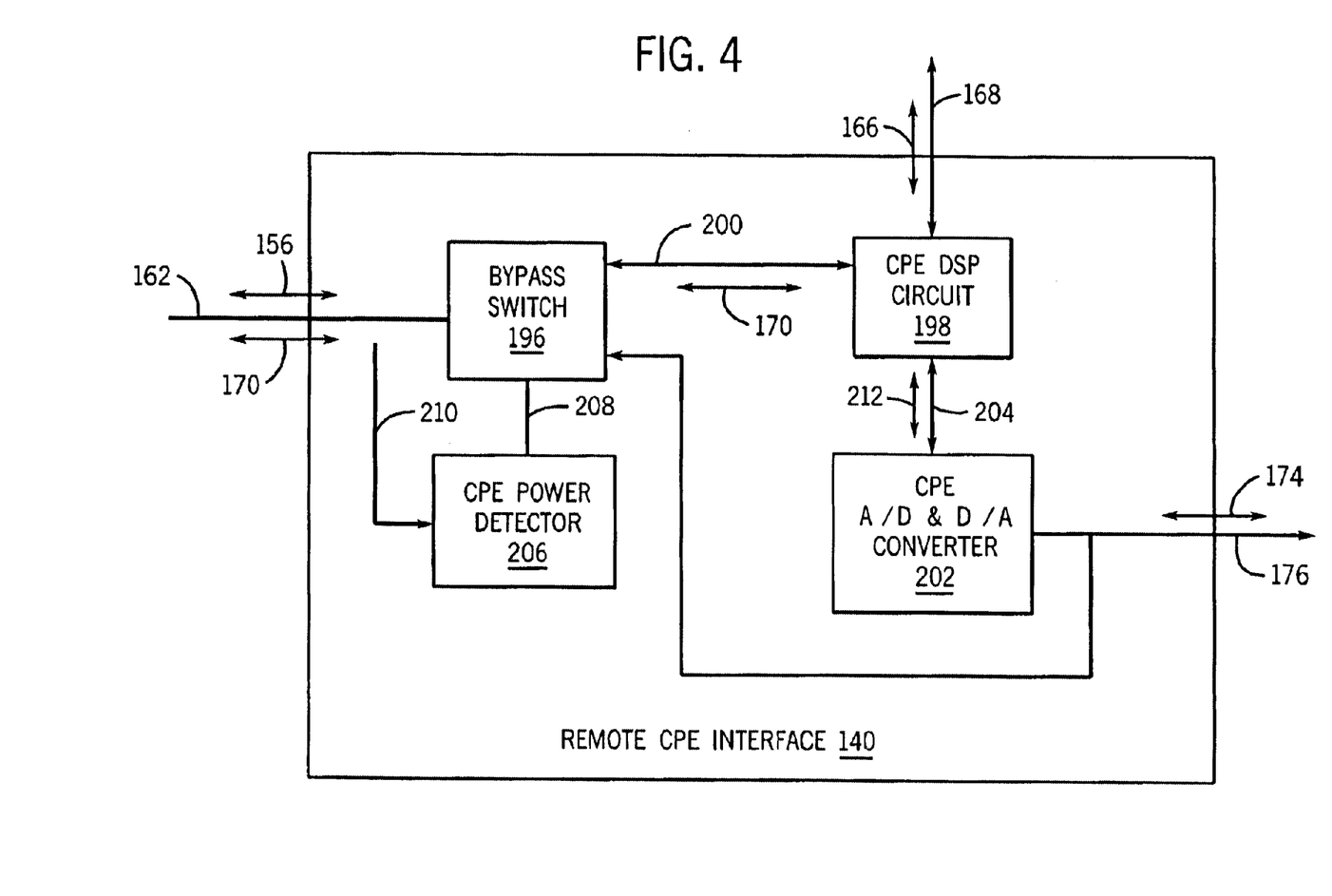
FIG. 4 shows a block diagram for the remote consumer premises equipment (CPE) interface block shown in FIG. 2.

FIG. 4 illustrates the functional blocks of the remote CPE interface 140. The remote CPE interface 140 comprises the following sub-components: a bypass switch 196; a CPE DSP circuit 198 connected to the bypass switch 196 via a signal connection 200; a CPE A/D and D/A converter 202 connected to the CPE DSP circuit 198 via connection 204; and a CPE power detector 206 connected the bypass switch 196 via connection 208. The bypass switch 196 is preferably a filter, splitter, or relay device.

In one direction (communication from the central office 148, FIG. 2, to the subscriber premises 138), the bypass switch 196, FIG. 4, receives a signal via subscriber line 162. If there is a power failure at the remote CPE interface 140 the received signal is determined to be an life line signal (of a type similar to analog POTS signal 156), FIG. 2, and the CPE power detector 206 sets the bypass switch 196 to pass the life line signal to the CPE device 142, FIG. 2 via connection 176. If instead there is no power failure, the signal is determined to be combined digital signal 170 from the POTS switch 160, FIG. 2, and the CPE power detector 206, FIG. 4, sets the bypass switch 196, FIG. 3, to pass the combined digital signal 170 to the CPE DSP circuit 198 via line 200.

In this direction the CPE DSP circuit 198 functions as an uncombiner circuit. The CPE DSP circuit 198 receives the combined digital signal 170 and extracts an extracted high speed data signal 166 (which may also selectively include POTS signal information) and passes it to the data interface 144, FIG. 2. The CPE DSP circuit 198 also extracts an extracted digital POTS signal 212 and passes it to the CPE A/D and D/A converter 202 via connection 204. The CPE A/D and D/A converter 202 operates as a digital to analog converter. The CPE A/D and D/A converter 202 then converts the extracted digital POTS signal 212 to the analog POTS signal 174 and passes it to the CPE device 142, FIG. 2 via connection 176.

In the other direction (communication going from the subscriber premises 138, FIG. 2, to the central office 148), the CPE A/D and D/A converter 202, FIG. 4, functions as a analog to digital converter. The CPE A/D and D/A converter 202 receives the analog POTS signal 174 from the CPE device 142 and converts it to a digital POTS signal 212 and passes it, via connection 204, to the CPE DSP circuit 198. In this direction, it is appreciated that the CPE DSP circuit 198 functions as a combiner circuit.

The CPE DSP circuit 198 receives the high speed data signal 166, from the data interface 144, FIG. 2, and combines it with the digital POTS signal 212, FIG. 4, creating the combined digital signal 170. The CPE DSP circuit 198 then transmits the combined digital signal 170, on line 200, to the bypass switch 196. The CPE DSP circuit 198 is preferably any digital circuit that is capable of combining the high speed data signal 166 and the digital POTS signal 212 in the combined digital signal 170. Examples of the CPE DSP circuit 198 include multiplexer circuits, interlacer circuits, multiplier circuits, digital encoders circuits or any other combiner circuit equivalent.

The combined digital signal 170, FIG. 4, has one frequency band that employs the entire communication spectrum. The CPE DSP circuit 198 combines the high speed data 166 and the digital POTS signal 212 using well known digital techniques (such as multiplying, multiplexing, interleaving, and encoding) that allow the combined digital signal 170 to be continuos in frequency across the entire communication spectrum including the POTS 0–4 kHz frequency band.

Again, it is appreciated that the combined digital signal 170 may selectively use two frequency bands if the XDSL system employs frequency division multiplexing (FDM) techniques because of the existence of both an upstream and a downstream channel. Examples of such systems would include ADSL, ADSL-lite, and VDSL systems. However, even in these examples the combined digital signal 170 is composed of a POTS signal and high speed data signal that are spectrally combined.

The bypass switch 196 receives both the analog POTS signal 174 and the combined digital signal 170. If the remote CPE interface 140 is powered at the subscriber premises 138, the bypass switch 196 passes the combined digital signal 170 to subscriber line 162. If instead, the remote CPE interface 140 is not powered (a life line condition) at the subscriber premises 138, the bypass switch 196 passes the analog POTS signal 176 (which is the same type of signal as analog POTS signal 156) to subscriber line 162.

The CPE power detector 206 is an intelligent circuit that determines whether a power failure has occurred at the remote CPE interface 140. If a power failure has occurred, the CPE power detector 206 sets the bypass switch 196 to pass the analog POTS signal 174 (a life line signal) to the subscriber line 162. It is appreciated that the CPE power detector 206 may selectively determine a power failure at the remote CPE interface 140 and transmit that information to either the central office 148, FIG. 2, or the POTS switch 160. The bypass power detector 196, FIG. 4, (similar to the PS power detector 184 of FIG. 3) may selectively include the circuitry of a power meter.

Figure 5:
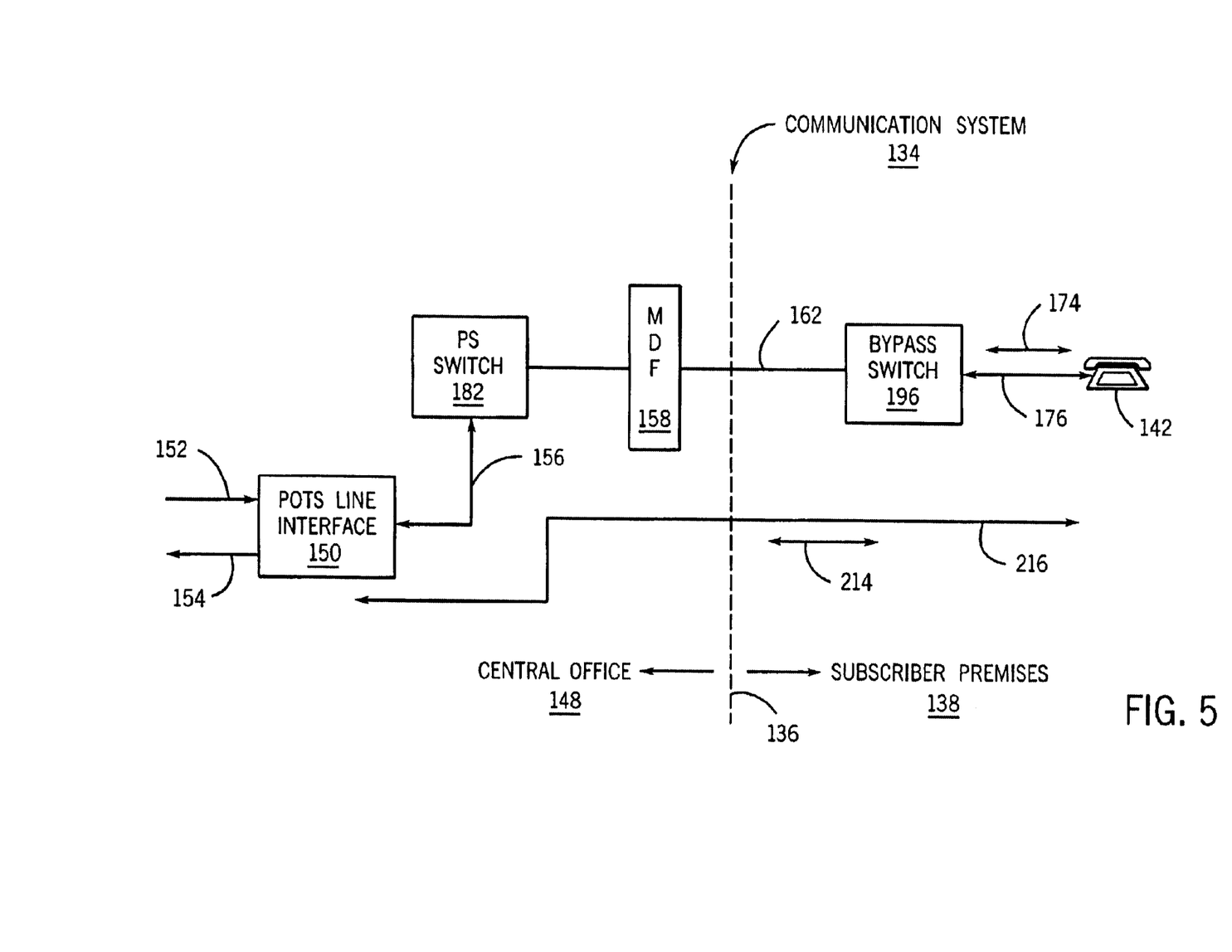
FIG. 5 shows a life line communication path for the communication system shown in FIG. 2 in a life line condition.

FIG. 5 shows the operation of the communication system 134, FIG. 2, in a life line condition. A life line signal 214 is shown traveling on a life line communication path 216 between the central office 148 and the subscriber premises 138. The life line communication path 216 comprises a path that starts, in one direction, at the POTS. line interface 150 and ends at the CPE device 142. The life line communication path 216 runs through the line 156, the PS switch 182, the MDF 158, the subscriber line 162, the bypass switch 196 and connection 176. The life line signal 214 is a conventional POTS signal such as the analog POTS signal 156 and 174. The life line communication path 214 allows a subscriber and central office 148 to communicate (with life line signals 214) in the event of a power failure at the remote CPE interface 140, FIG. 2.

While the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention are thus within its spirit and scope.

What is claimed:

1. A method of telephonic signaling in a communication system between a central office and a remote CPE interface, located at a subscriber premises, in which the communication system supports both POTS and high speed data services comprising the steps of:

transforming an analog POTS signal to a digital POTS signal, wherein the communication system supports voice and data transmission, wherein the analog POTS signal comprises a low frequency POTS signal;

combining the digital POTS signal with a high speed data signal into a combined digital signal that is based on a single communication spectrum, including the step of multiplexing the digital POTS signal and the high speed data signal at the central office;

extracting the high speed data signal from the combined digital signal with an uncombiner circuit to establish an extracted high speed data signal;

extracting the digital POTS signal from the combined digital signal with the uncombiner circuit to establish an extracted digital POTS signal, such that the extracted digital POTS signal is convertible into an analog telephonic signal;

transmitting the analog POTS signal and the high speed data signal from the central office;

transmitting the combined digital signal to the remote CPE interface;

transforming the extracted digital POTS signal into an analog telephonic signal with a digital to analog converter;

transmitting the analog telephonic signal to a CPE device at the subscriber premises;

identifying the occurrence of a power failure at the remote CPE interface, and establishing a life line communication path from the central office to the remote CPE interface in response to identifying the occurrence of the power failure at the remote CPE interface.

2. The method of claim 1 wherein the step of establishing further includes the steps of transmitting a life line signal from the central office to the remote CPE interface in response to the power failure; and setting a bypass switch, at the remote CPE interface, to pass the life line signal to the CPE device without passing the life line signal through the uncombiner circuit or digital to analog converter.

3. The method of claim 1 wherein the step of identifying is performed at the central office.

4. The method of claim 2 wherein in the life line signal is an analog POTS signal for providing POTS services to the CPE device upon the power failure identification at the remote CPE interface.

5. The method of claim 2 wherein the remote CPE interface is powered at the subscriber premises.

6. A method of telephonic signaling in a communication system between a central office and a remote CPE interface, located at a subscriber premises, in which the communication system supports both POTS and high speed data services comprising the steps of:

transforming an analog POTS signal to a digital POTS signal, wherein the communication system supports voice and data transmission, wherein the analog POTS signal comprises a low frequency POTS signal, wherein the analog POTS signal is transmitted from a CPE device;

combining the digital POTS signal with a high speed data signal into a combined digital signal that is based on a single communication spectrum;

extracting the high speed data signal from the combined digital signal with an uncombiner circuit to establish an extracted high speed data signal; and extracting the digital POTS signal from the combined digital signal with the uncombiner circuit to establish an extracted digital POTS signal, such that the extracted digital POTS signal is convertible into an analog telephonic signal;

identifying the occurrence of a power failure at the remote CPE interface, wherein the step of identifying is performed at the central office; and establishing a life line communication path from the central office to the remote CPE interface in response to the power failure.

7. The method of claim 6 wherein the step of establishing further includes the steps of transmitting a life line signal from the central office to the remote CPE interface in response to the power failure; and setting a bypass switch, at the remote CPE interface, to pass the life line signal to the CPE device without passing the life line signal through the uncombiner circuit or the digital to analog converter.

8. The method of claims 6 or 7 wherein the life line signal is an analog POTS signal for providing POTS services to the CPE device upon the power failure at the remote CPE interface.

9. The method of claims 6 or 7 wherein the remote CPE interface is powered at the subscriber premises.

10. A method of telephonic signaling in a communication system between a central office and a remote CPE interface, located at a subscriber premises, in which the communication system supports both POTS and high speed data services comprising the steps of:

transforming an analog POTS signal to a digital POTS signal, wherein the communication system supports voice and data transmission;

combining the digital POTS signal with a high speed data signal into a combined digital signal that is based on a single communication spectrum, wherein the combined digital signal has two communication spectrums;

extracting the high speed data signal from the combined digital signal with an uncombiner circuit to establish an extracted high speed data signal; and extracting the digital POTS signal from the combined digital signal with the combiner circuit to establish an extracted digital POTS signal, such that the extracted digital POTS signal is convertible into an analog telephonic signal;

identifying the occurrence of a power failure at the remote CPE interface, and establishing a life line communication path from the central office to the remote CPE interface in response to identifying the occurrence of the power failure at the remote CPE interface.

11. The method of claim 10 wherein the step of establishing further includes the steps of transmitting a life line signal from the central office to the remote CPE interface in response to the power failure; and setting a bypass switch, at the remote CPE interface, to pass the life line signal to the CPE device without passing the life line signal through the uncombiner circuit or digital to analog converter circuit.

12. A communication system that supports both POTS and high speed data services between a remote CPE interface, located at a subscriber premises, and a central office comprising:

an analog to digital converter for transforming an analog POTS signal to a digital POTS signal, wherein the communication system supports voice and data transmission, wherein the analog POTS signal comprises a low frequency POTS signal;

a combiner circuit for combining the digital POTS signal with a high speed data signal into a combined digital signal that has a single communication spectrum;

an uncombiner circuit for extracting the high speed data signal from the combined digital signal, and establishing an extracted high speed data signal;

a power detector means for identifying the occurrence of a power failure at the remote CPE interface; and means for establishing a life line communication path from the central office to the remote CPE interface in response to the power failure.

13. The system of claim 12 wherein the power detector means is at the central office.

14. The system of claim 12 wherein the establishing means further includes means for transmitting a life line signal from the central office to the remote CPE interface in response to the power failure, and a bypass switch, at the remote CPE interface, for passing the life line signal to the CPE device without passing the life line signal through the uncombiner circuit or digital to analog converter.

15. The system of claims 12 or 14 wherein the life line signal is an analog POTS signal for providing POTS services to the CPE device when there is a power failure at the remote CPE interface.

16. The system of claims 12 or 14 wherein the remote CPE interface is powered at the subscriber premises.

17. A communication system that supports both POTS and high speed data services between a remote CPE interface, located at a subscriber premises, and a central office comprising:

an analog to digital converter for transforming an analog POTS signal to a digital POTS signal, wherein the communication system supports voice and data transmission, wherein the analog POTS signal comprises a low frequency POTS signal, wherein the analog POTS signal is transmitted from a CPE device;

a combiner circuit for combining the digital POTS signal with a high speed data signal into a combined digital signal that has a single communication spectrum;

an uncombiner circuit for extracting the high speed data signal from the combined digital signal and establishing an extracted high speed data signal;

means for identifying the occurrence of a power failure at the remote CPE interface, wherein the identifying means is at the central office; and means for establishing a life line communication path from the central office to the remote CPE interface in response to the power failure.

18. The system of claim 17 wherein the establishing means further includes means for transmitting a life line signal from the central office to the remote CPE interface in response to the power failure, and a bypass switch, at the remote CPE interface, for passing the life line signal to the CPE device without passing the life line signal through the uncombiner circuit or derived POTS circuit.

19. The system of claims 17 or 18 wherein the life line signal is an analog POTS signal for providing POTS services to the CPE device upon the occurrence of a power failure at the remote CPE interface.

20. The system of claims 17 or 18 wherein the remote CPE interface is powered at the subscriber premises.

21. A communication system that supports both POTS and high speed data services between a remote CPE interface, located at a subscriber premises, and a central office comprising:

- an analog to digital converter for transforming an analog POTS signal to a digital POTS signal, wherein the communication system supports voice and data transmission;
- a combiner circuit for combining the digital POTS signal with a high speed data signal into a combined digital signal that has a single communication spectrum, wherein the combined digital signal has two communication spectrums;
- an uncombiner circuit for extracting the high speed data signal from the combined digital signal, and establishing an extracted high speed data signal;
- a power detector means for identifying the occurrence of a power failure at the remote CPE interface; and
- means for establishing a life line communication path from the central office to the remote CPE interface in response to the power failure.

22. The system of claim 21 wherein the establishing means further includes means for transmitting a life line signal from the central office to the remote CPE interface in response to the power failure; and

- a bypass switch, at the remote CPE interface, for passing the life line signal to the CPE device without passing the life line signal through the uncombiner circuit or digital to analog converter.

* * * * *